(12) United States Patent
Fish et al.

(10) Patent No.: US 9,395,491 B2
(45) Date of Patent: Jul. 19, 2016

(54) SHIELDING REGIONS FOR PHOTONIC INTEGRATED CIRCUITS

(71) Applicant: Aurrion, Inc., Goleta, CA (US)

(72) Inventors: Gregory Alan Fish, Santa Barbara, CA (US); Erik Norberg, Santa Barbara, CA (US)

(73) Assignee: Aurrion, Inc., Goleta, CA (US)

( * ) Notice: Subject to any disclaimer, the term of this patent is extended or adjusted under 35 U.S.C. 154(b) by 0 days.

(21) Appl. No.: 14/612,315

(22) Filed: Feb. 3, 2015

(65) Prior Publication Data

US 2015/0219850 A1 Aug. 6, 2015

Related U.S. Application Data

(60) Provisional application No. 61/936,189, filed on Feb. 5, 2014.

(51) Int. Cl.
*G02B 6/136* (2006.01)
*H04B 10/00* (2013.01)
*G02B 6/42* (2006.01)
(Continued)

(52) U.S. Cl.
CPC ............ *G02B 6/136* (2013.01); *G02B 6/12004* (2013.01); *G02B 6/4277* (2013.01); *H04B 10/00* (2013.01); *H04J 14/00* (2013.01)

(58) Field of Classification Search
CPC .. G02B 6/12004; G02B 6/1225; G02B 6/136; H01L 31/173
USPC ............................................. 385/14, 129–131
See application file for complete search history.

(56) References Cited

U.S. PATENT DOCUMENTS 5,298,784 A * 3/1994 Gambino ............ H01L 23/5252
257/529
5,629,534 A * 5/1997 Inuzuka ................ H01L 31/173
257/524

(Continued)

FOREIGN PATENT DOCUMENTS

DE 3709302 A1 10/1988
DE 19510631 A1 9/1995

(Continued)

OTHER PUBLICATIONS

"European Application Serial No. 15000325.9, Extended European Search Report mailed Oct. 30, 2015", 12 pgs.

*Primary Examiner* — Ryan Lepisto
(74) *Attorney, Agent, or Firm* — Schwegman Lundberg & Woessner

(57) ABSTRACT

Described herein are methods, systems, and apparatuses to utilize shielding regions formed in photonic integrated circuits (PICs). Portions of layers of a PIC are selectively removed, and optionally, replaced with another material. These regions are formed to block stray light from interacting with optical components of the PIC, and therefore can prevent optical crosstalk and/or noise. Metal or another absorption/reflective material can be deposited in the place of the removed layer portions of the PIC to absorb or reflect light. Additionally, by depositing metal, RF isolation can be achieved by forming a ground plane, by forming a ground trace that shields a signal trace in an RF transmission line, or by placing a conductor which terminates electric fields between sensitive RF receivers and adjacent RF elements. Additionally the process operations required to perform isolation can also be used to change the thermal conductivity of devices and regions on a PIC.

17 Claims, 6 Drawing Sheets

(51) Int. Cl.
*H04J 14/00* (2006.01)
*G02B 6/12* (2006.01)

(56) References Cited

U.S. PATENT DOCUMENTS

| | | | |
|---|---|---|---|
| 5,747,860 A | 5/1998 | Sugiyama et al. | |
| 6,100,973 A * | 8/2000 | Lawandy | A61N 5/0601 |
| | | | 356/246 |
| 2003/0091303 A1 | 5/2003 | Kami et al. | |
| 2005/0133930 A1 | 6/2005 | Savastisuk et al. | |
| 2007/0102769 A1 | 5/2007 | Chuang et al. | |
| 2008/0290524 A1 | 11/2008 | Lanzerotti et al. | |
| 2013/0177274 A1 | 7/2013 | Kosenko et al. | |
| 2013/0177281 A1 | 7/2013 | Kosenko et al. | |
| 2014/0027826 A1 * | 1/2014 | Assefa | H01L 35/34 |
| | | | 257/290 |

FOREIGN PATENT DOCUMENTS

| | | |
|---|---|---|
| DE | 19717562 A1 | 11/1997 |
| GB | 2370883 A | 7/2002 |
| WO | WO-0146716 A2 | 6/2001 |

* cited by examiner

US 9,395,491 B2

SHIELDING REGIONS FOR PHOTONIC INTEGRATED CIRCUITS

CROSS-REFERENCE TO RELATED APPLICATIONS

This application claims the benefit of priority to U.S. Provisional patent application entitled "SELECTIVE BACKSIDE PROCESSING FOR SHIELDING IN A PHOTONIC INTEGRATED CIRCUIT," Ser. No. 61/936,189, filed Feb. 5, 2014, which is hereby incorporated herein by reference in its entirety.

FIELD

Embodiments generally pertain to optical devices and more specifically to devices included in photonic integrated circuits.

BACKGROUND

Signal integrity is a concern for photonic integrated circuits (PICs) that utilize data transmission and/or reception components, as multiple transmitting and/or receiving signals may be present on a PIC. Signals are susceptible to degradation due to various combinations of optical, electrical, and thermal crosstalk. Crosstalk of a transmitter signal onto a receiver signal is especially a problem since transmitted signals may comprise much higher power than received signals, both in the electrical and in the optical domain.

BRIEF DESCRIPTION OF THE DRAWINGS

The following description includes discussions of figures having illustrations given by way of example of implementations and embodiments of the subject matter disclosed herein. The drawings should be understood by way of example, and not by way of limitation. As used herein, references to one or more "embodiments" are to be understood as describing a particular feature, structure, or characteristic included in at least one implementation of the disclosure. Thus, phrases such as "in one embodiment" or "in an alternate embodiment" appearing herein describe various embodiments and implementations of the disclosure, and do not necessarily all refer to the same embodiment. However, such phrases are also not necessarily mutually exclusive.

Descriptions of certain details and implementations follow, including a description of the figures, which may depict some or all of the embodiments described below, as well as a description of other potential embodiments or implementations of the concepts presented herein. An overview of embodiments is provided below, followed by a more detailed description with reference to the drawings.

DESCRIPTION

Embodiments of the disclosure describe shielding regions for photonic integrated circuits (PICs). Throughout this specification, several terms of art are used. These terms are to take on their ordinary meaning in the art from which they come, unless specifically defined herein or unless the context of their use would clearly suggest otherwise. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects of the disclosure.

Figure 1A:
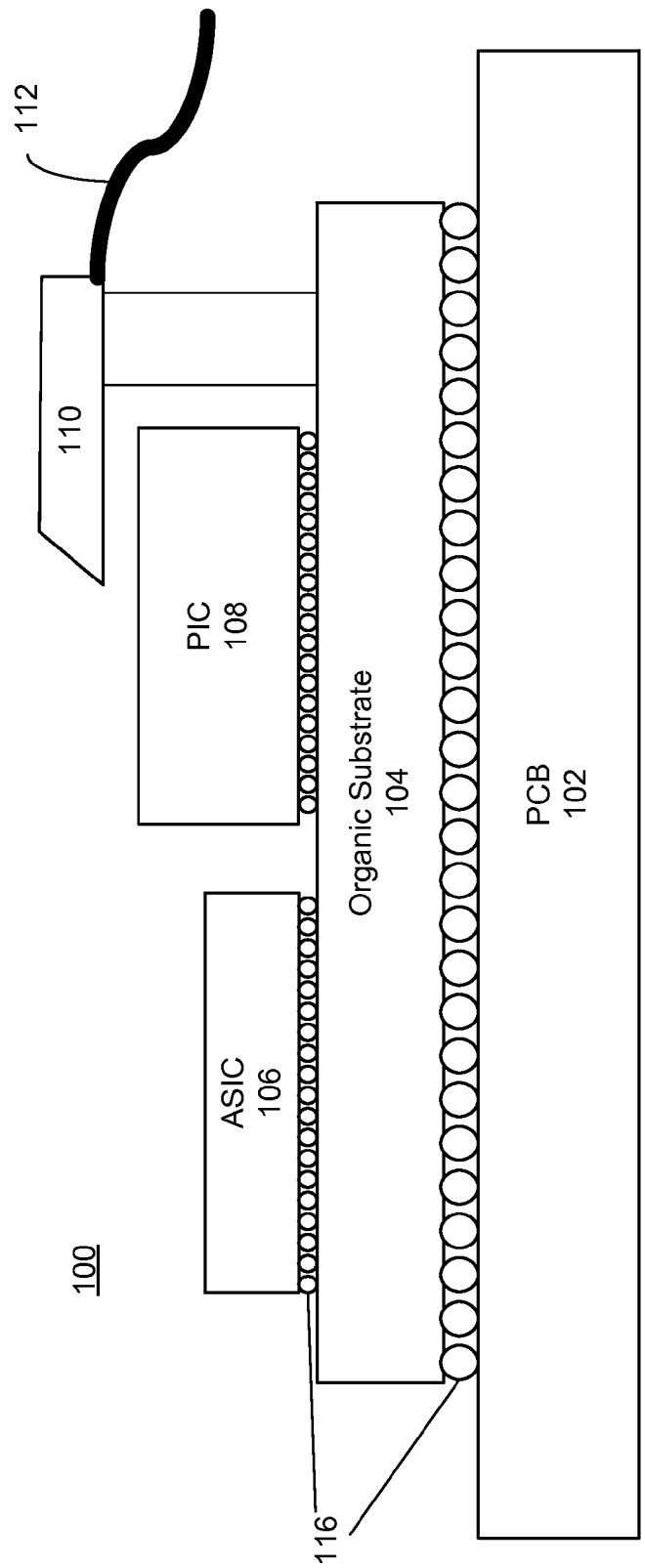
FIG. 1A-FIG. 1B are illustrations of components of a device or system including a PIC according to an embodiment of the disclosure.
Figure 1B:
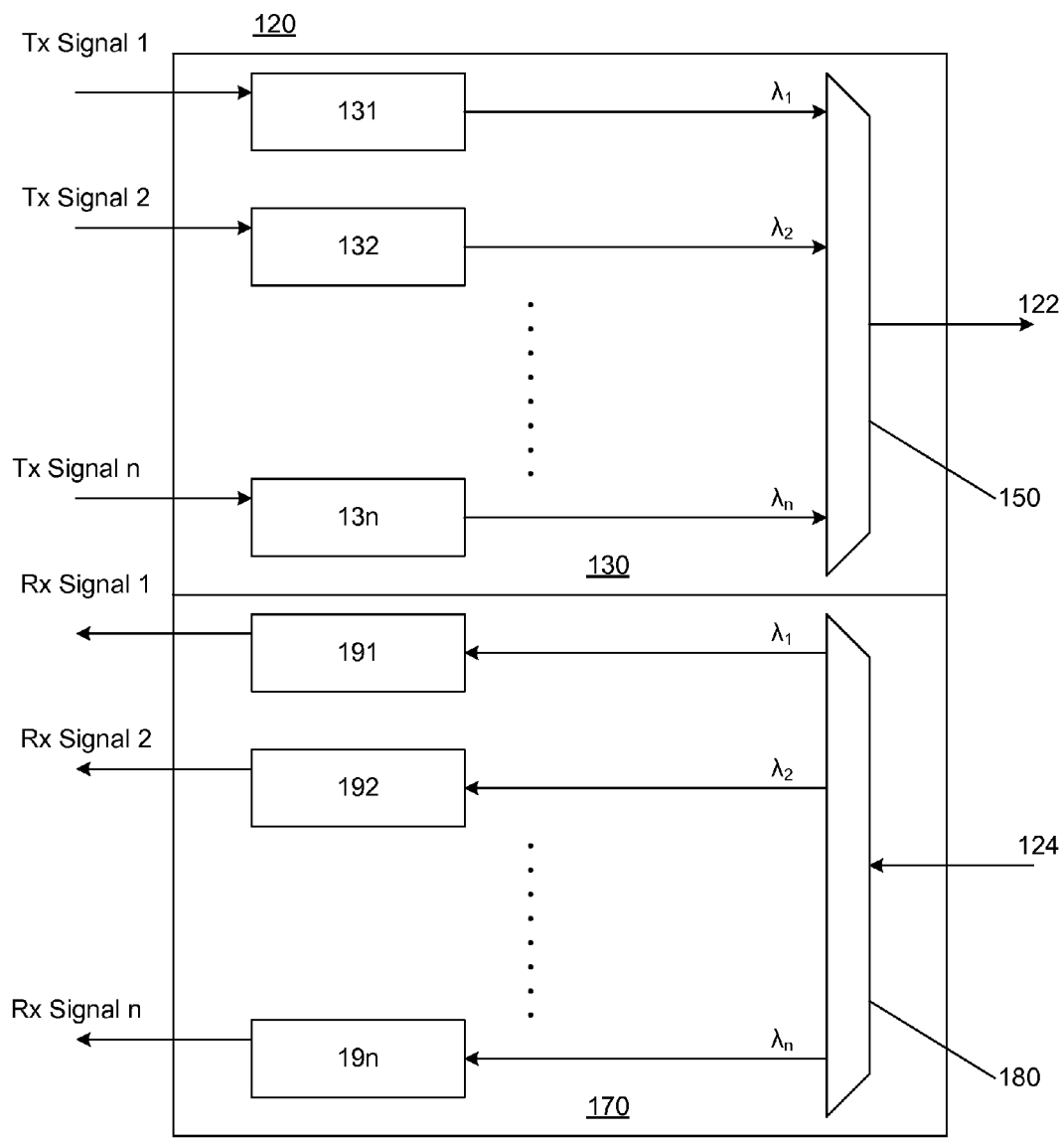

FIG. 1A-FIG. 1B are illustrations of components of a device or system including a PIC according to an embodiment of the disclosure. In this embodiment, a device or system 100 is shown to include a printed circuit board (PCB) substrate 102, an organic substrate 104, an application specific integrated circuit (ASIC) 106, and a PIC 108, which exchanges light with an optical fiber 112 via a connector 110. The optical devices of the PIC 108 are controlled, at least in part, by control circuitry included in the ASIC 106.

Both the ASIC 106 and the PIC 108 are communicatively coupled via the organic substrate 104. The PCB 108 is coupled to the organic substrate 104 via a ball grid array (BGA) interconnect 116, and may be used to interconnect the organic substrate (and thus, the ASIC 106 and the PIC 108) to other components of the device or system 100 not shown—e.g., interconnection modules, power supplies, etc.

The PIC 108 may be formed of any semiconductor material suitable for photonic devices and photonic operation, such as silicon based materials (e.g., silicon (Si), silicon nitride (SiN)), non-silicon material such as III-V material, magneto-optic material, or crystal substrate material, or a combination of silicon and non-silicon material (alternatively referred to as "heterogeneous material"). The PIC 108 may include one or more optical devices controlled, at least in part, by control circuitry included in the ASIC 106, and may be formed of any semiconductor material suitable for electronic devices and electronic operation, such as Si.

The PIC 108 may include a plurality of data transmission and/or reception components; devices including both transmission and reception components may be referred to as transceiver devices. For PICs including transceiver devices, crosstalk of a transmitter signal onto a receiver signal is a potential problem as transmitted signals may be much higher power than received signals, both in the electrical and in the optical domain.

FIB. 1B illustrates a wavelength divisional multiplexing (WDM) transceiver 120, which is shown to include a transmitter module 130 for generating an output WDM signal 122 (to be received by the optical fiber 112) having n different WDM wavelengths. These different WDM wavelengths can be based, for example, on, the L, C and S bands for WDM applications. The transmitter module 120 includes tunable laser modules 131-13n to generate light, which can be further modulated based on transmission signal data. Said laser modules and modulators can be integrated or discrete components (not shown). A multiplexer 150 is shown to receive n modulated signals and outputs a WDM output signal 122 that comprises multiple output channels within a WDM spectral band.

The transceiver 120 further includes a receiver module 170 including a de-multiplexer 180 to receive a WDM input signal 124 (from the optical fiber 112) and output the received signal at different WDM wavelengths along n different optical paths. It is to be understood that in other embodiments, the transmitter module 130 and the receiver module 170 can be included in separate devices (i.e., a separate transmitter and receiver). In this embodiment, optical detectors 191-19n are included in the n optical paths and convert the de-multiplexed signals of the WDM input signal 124 into n reception data signals for further processing.

Optical and electrical signals utilized by components of the PIC 100 are susceptible to degradation due to both optical and electrical crosstalk. For example, crosstalk from the WDM output signal 122 may affect the WDM input signal 124, due to the higher power levels of the WDM output signal 122. Furthermore, electrical signals used by devices of the PIC 100 may be generated electromagnetic interference (EMI)—i.e., undesired conducted or radiated electrical disturbances, which can interfere with the operation of the devices of the PIC 100.

The exemplary embodiments described below utilize shielding regions formed in PICs. As discussed in further detail below, portions of layers of a PIC are selectively removed, and in some embodiments, replaced with another material. These regions can block stray light from interacting with optical components of the PIC, and therefore can prevent optical crosstalk and/or noise. Metal or another absorption/reflective material can be deposited in the place of the selectively removed portions of layers of a PIC to absorb or reflect light. Additionally, by depositing metal after selectively removing portions of the substrate layer, radio frequency (RF) isolation can be achieved by forming a ground plane, by forming a ground trace that shields a signal trace in an RF transmission line, or by placing a conductor which terminates electric fields between sensitive RF receivers and adjacent RF elements. By reducing optical and RF crosstalk on a PIC, multiple signal channels can be integrated onto the same substrate, and high power signal transmitters can be integrated with low power signal receivers. Additionally the process operations required to perform isolation can also be used to change the thermal conductivity of devices and regions on a PIC.

Figure 2A:
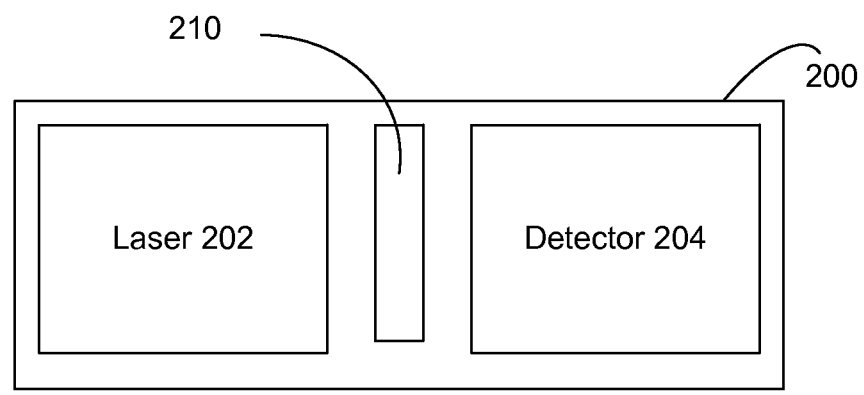
FIG. 2A-FIG. 2B illustrate providing one or more shielding/isolation regions for multiple components of a PIC according to embodiments of the disclosure.
Figure 2B:
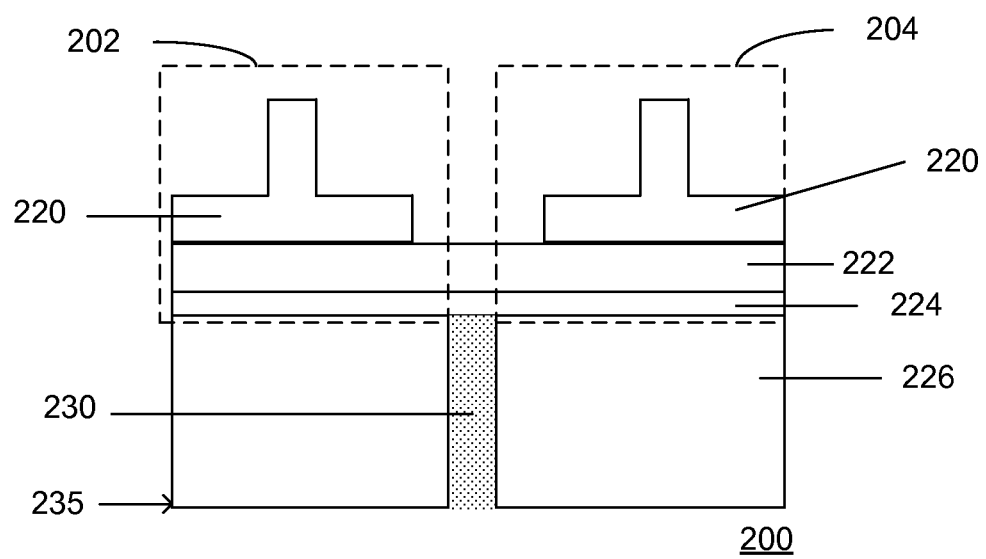

FIG. 2A-FIG. 2B illustrate providing one or more regions for multiple components of a PIC according to an embodiment of the disclosure. FIG. 2A illustrates a top view of a PIC 200, which is shown to include multiple optical devices. In this embodiment, an optical transmission device 202 (e.g., a laser) and an optical reception device 204 (e.g., a detector) are included in the PIC 200; in other embodiments, similar components (e.g., adjacent transmission or reception components) may utilize the shielding region described below. Furthermore, it is to be understood that the number of components illustrated in the PIC 200 utilizing the shielding region described below is for exemplary purposes only; in other embodiments, PICs can contain a plurality of transmitter channels and/or receiver channels, and thus a plurality of shielding regions.

In this embodiment, a shielding region (alternatively referred to herein as an isolation region) 210 is utilized to provide shielding for electrical and/or optical signals used by both the laser 202 and the detector 204. In this embodiment, the isolation region 210 is shown to be disposed between the devices 202 and 204. In other embodiments described in further detail below, isolation regions can be disposed proximate to a specific device of a PIC.

FIG. 2B illustrates a cross-sectional view of the PIC 200 according to an embodiment of the disclosure, In this embodiment, the PIC 200 is shown to comprise device layers 220 and 222, a buried oxide layer 224, and a substrate layer 226. In some embodiments, the PIC 200 comprises heterogeneous semiconductor material, wherein the device layer 220 comprises non-silicon semiconductor material, and the device layer 222 comprises silicon semiconductor material (with a cladding layer (not shown) disposed between the layers 220 and 222 in some embodiments).

In this embodiment, a section of the substrate layer 226 is removed in order to provide shielding for electrical and/or optical signals; the section where substrate is removed from the substrate layer 226 is shown as the region 230. The region 230 can be filled with any material to provide electrical, optical, and/or thermal isolation for the optical devices 202 and 204, or the region 230 can be unfilled (i.e., comprise air). The removal of substrate material from the substrate layer 226 prevents light from passing through the substrate between the optical devices 202 and 204, thereby optically isolating the devices from one another.

The removal of substrate material from the substrate layer 226 also provides electrical shielding between the optical devices 202 and 204, and thereby improves the performance of said devices, as RF transmission lines may experience crosstalk with one another. The substrate layer 226 of the PIC 200 may be selectively removed and replaced with a layer of conductive material on which the RF waves terminate; this conductive layer may serve as a ground plane in the vicinity of several devices or RF waveguides. It may also be placed between the optical transmission device 202 and the optical reception device 204 to minimize the crosstalk from higher power transmitter signals onto lower power receiver signals. The conductive layer may serve as the ground shielding for a single signal path. In some embodiments, the device layer 222 and the buried oxide layer 224 can additionally be etched and replaced with a conductive shunt to allow electrical contact to the shielding conductor. Furthermore, the isolation region 230 can provide thermal isolation for the optical devices 202 and 204 to minimize thermal crosstalk.

Figure 3:
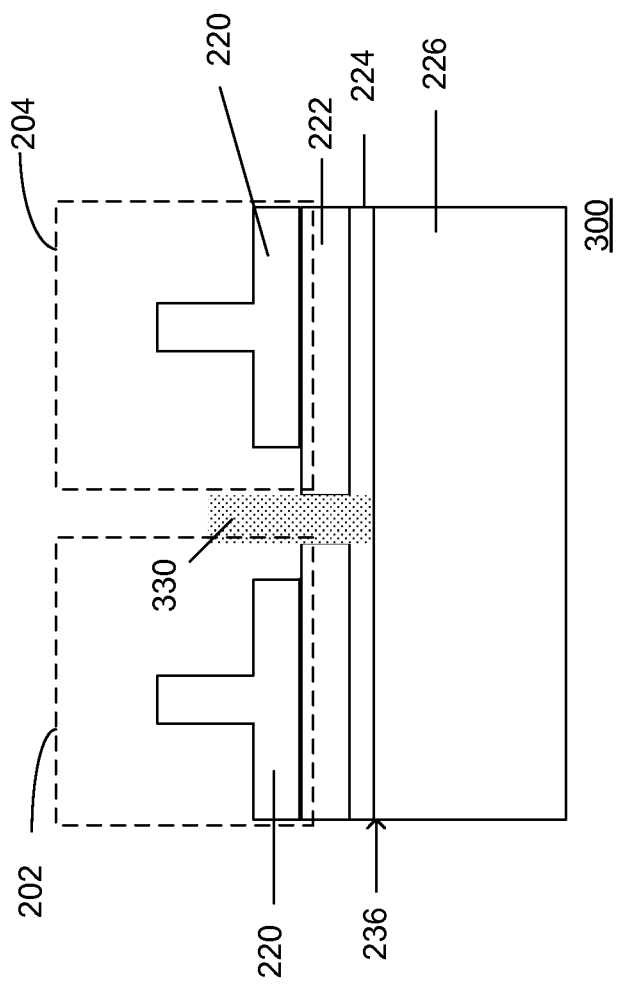
FIG. 3 illustrates providing one or more shielding/isolation regions for multiple components of a PIC according to an embodiment of the disclosure.

In some embodiments, the device layer 222 comprises a waveguide layer and further includes an etch aligned with region 230 to provide further optical isolation between the optical devices 202 and 204. In some embodiments, such as the embodiment illustrated in FIG. 3, isolation regions are formed by removing portions of layers above the substrate layer of a PIC. In this example, the PIC 300 includes layers and devices similar to that of FIG. 2A-2B; however, in contrast to the isolation region 230 of that illustrated embodiment, portions of the device layer 222 and the buried oxide layer 224 are removed to form region 330. The region 330 can be filled with any material to provide electrical/optical isolation, or can be unfilled (i.e., comprise air) to provide electrical/optical isolation.

The above described regions—the region 230 of FIG. 2B and the region 330 of FIG. 3, can be used to provide optical, thermal, and/or electrical isolation of switches, temperature-controlled filters to reduce crosstalk, between active devices layers that generate heat in operation, etc. Optical shielding between the optical devices 202 and 204 improves the operation of said devices, as stray optical light may propagate in the substrate layer 226, leading to interference. For example an optical signal may be generated from the optical transmission device 202 (e.g., an externally modulated laser (EML)), and stray light can be scattered into the substrate layer 226 from a grating coupler included in the optical transmission device 202 intended to couple the light to an off-chip fiber. Some of this stray light can impinge upon the optical reception component 204 of the PIC 200, and can add crosstalk to the received signal.

Figure 4:
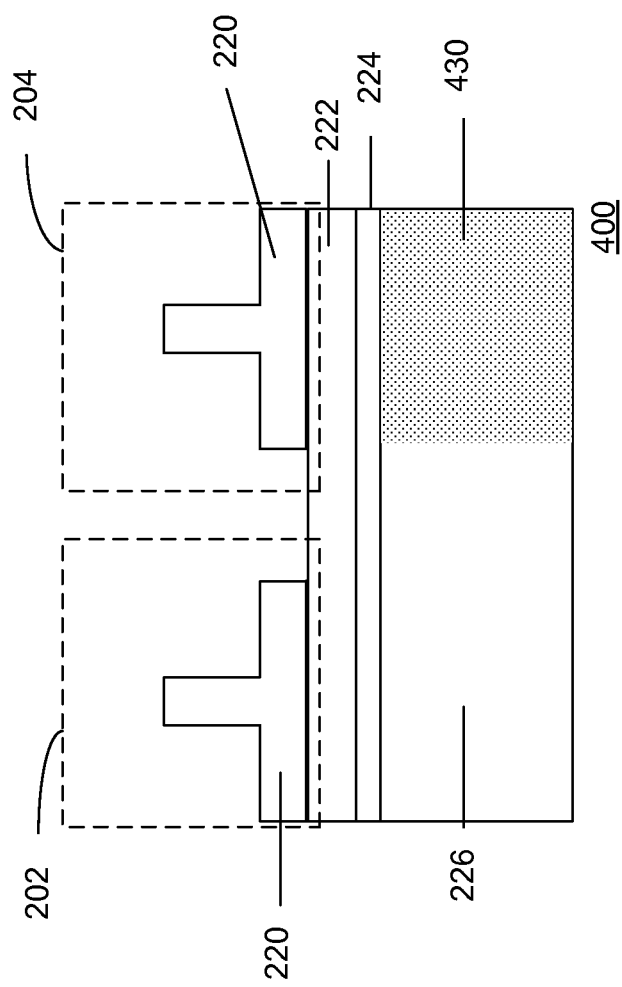
FIG. 4 illustrates providing a shielding/isolation region for a component of a PIC according to an embodiment of the disclosure.

In some embodiments, to mitigate optical crosstalk, portions of a substrate layer can be selectively removed around or proximate to a specific device in order to block the propagation of light in the substrate layer. In some embodiments, such as the embodiment illustrated in FIG. 4, isolation regions are formed by removing portions of layers below a device to be optically, thermally, and/or electrically isolated. In this example, the PIC 400 includes layers and devices similar to that of FIGS. 2A-2B and FIG. 3. Portions of the substrate layer 226 are shown to be removed proximate to the optical receiving device 204 to form a region 430 to provide isolation from other devices of the PIC 400 (e.g., device 202). In some embodiments, an absorbing or reflecting material, such as a metal, may be deposited in the region 430 to improve the optical isolation. In conjunction with selective substrate removal, the etching of or the deposition upon the buried oxide layer 224 and/or the device layer 222 may also be used to enhance the optical isolation of the optical receiving device 204.

In some embodiments, the material filling/depositing into the region 430 can serve multiple purposes, including optical isolation, RF isolation, and thermal conductivity modification. The isolation region 430 can be filled with thermally conductive material to draw thermal crosstalk within the substrate layer 226 away from the device 204; in some embodiments, the thermally conductive material may be coupled to a heat sink for the PIC 400.

Figure 5:
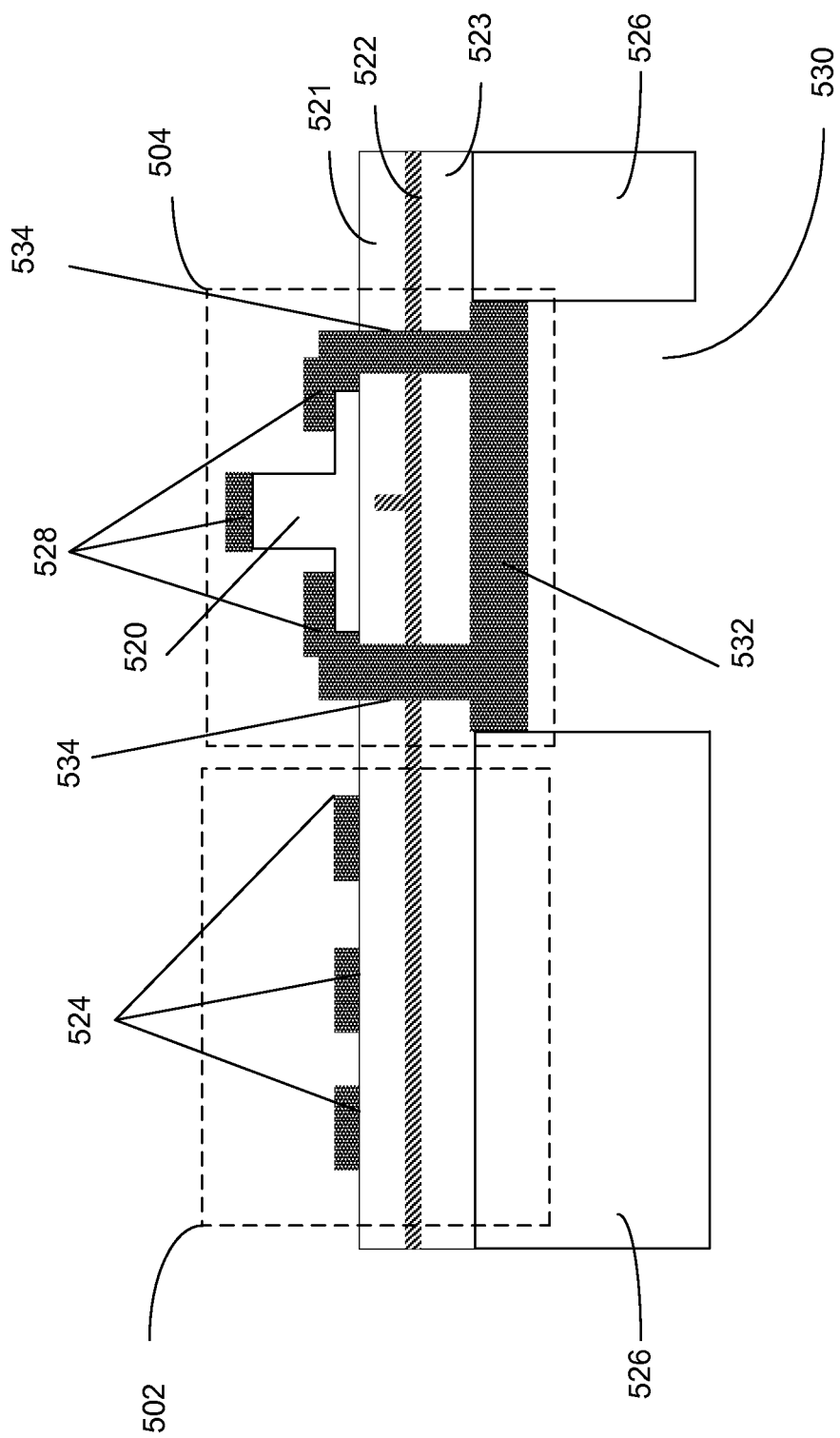
FIG. 5 is an illustration of a PIC with multiple optical devices and a shielding/isolation region formed for one of the devices according to an embodiment of the disclosure.

FIG. 5 is an illustration of a PIC with multiple optical devices and an isolation region formed for one of the devices according to an embodiment of the disclosure. In this embodiment, PIC 500 includes a plurality of devices 502 and 504 formed on a substrate layer 526.

In this embodiment, the device 504 comprises a photodetector device formed from a cladding layer 521, a silicon waveguide layer 522, a buried oxide layer 523, an active region of the photodetector 520, and a plurality of metal contacts 528. The device 502 comprises a ground-signal-ground (GSG) waveguide formed from the cladding layer 521, the silicon waveguide layer 522, the buried oxide layer 523, and the metal contacts 524.

The device 502 may potentially impinge electronic crosstalk onto the device 504, such as EMI. In this embodiment, a region 530 is formed underneath the device 504 by removing portions of the substrate layer 526. In this embodiment, portions of the buried oxide layer 523, the silicon waveguide layer 522, and the cladding layer 521 are also removed to form a set of thru vias 534 surrounding the device 504. A metal 532 may be further deposited in region 530, and extend to make physical contact with some of the metal contacts 528. The surrounding structure formed by the deposited metal 532 can function as ground of a ground-signal (GS) RF transmission line; this GS transmission line configuration for the device 504 can reduced crosstalk from the adjacent GSG transmission line for the device 502; in alternative embodiments, a ground trace can be formed that shields a signal trace in an RF transmission line, or a conductor can be placed to terminates electric fields between the devices 502 and 504. Furthermore, the metal shielding provided by the deposited metal layer 532 can block stray light from being absorbed by the detector.

Reference throughout the foregoing specification to "one embodiment" or "an embodiment" means that a particular feature, structure, or characteristic described in connection with the embodiment is included in at least one embodiment of the present disclosure. Thus, appearances of the phrases "in one embodiment" or "in an embodiment" in various places throughout the specification are not necessarily all referring to the same embodiment. Furthermore, the particular features, structures, or characteristics can be combined in any suitable manner in one or more embodiments. In addition, it is to be appreciated that the figures provided are for explanation purposes to persons ordinarily skilled in the art and that the drawings are not necessarily drawn to scale. It is to be understood that the various regions, layers, and structures represented in the figures can vary in size and dimensions.

The above described embodiments can comprise silicon on insulator (SOI) or silicon-based (e.g., silicon nitride (SiN)) devices, or can comprise devices formed from both silicon and a non-silicon material. Said non-silicon material (alternatively referred to as "heterogeneous material") can comprise one of III-V material, magneto-optic material, or crystal substrate material.

III-V semiconductors have elements that are found in group III and group V of the periodic table (e.g., Indium Gallium Arsenide Phosphide (InGaAsP), Gallium Indium Arsenide Nitride (GaInAsN)). The carrier dispersion effects of III-V-based materials can be significantly higher than in silicon-based materials, as electron speed in III-V semiconductors is much faster than that in silicon semiconductors. In addition, III-V materials have a direct bandgap which enables efficient creation of light from electrical pumping. Thus, III-V semiconductor materials enable photonic operations with an increased efficiency over silicon for both generating light and modulating the refractive index of light.

Thus, III-V semiconductor materials enable photonic operation with an increased efficiency at generating light from electricity and converting light back into electricity. The low optical loss and high quality oxides of silicon are thus combined with the electro-optic efficiency of III-V semiconductors in heterogeneous optical devices; in some embodiments, said heterogeneous devices utilize low-loss heterogeneous optical waveguide transitions between the devices' heterogeneous and silicon-only waveguides.

Magneto-optic materials allow heterogeneous PICs to operate based on the magneto-optic (MO) effect. Such devices can utilize the Faraday effect, in which the magnetic field associated with an electrical signal modulates an optical beam, offering high bandwidth modulation, and rotates the electric field of the optical mode, enabling optical isolators. Said magneto-optic materials can comprise, for example, materials such as iron, cobalt, or yttrium iron garnet (YIG).

Crystal substrate materials provide heterogeneous PICs with a high electro-mechanical coupling, linear electro optic coefficient, low transmission loss, and stable physical and chemical properties. Said crystal substrate materials can comprise, for example, lithium niobate ($LiNbO_3$) or lithium tantalate ($LiTaO_3$).

In the foregoing detailed description, the method and apparatus of the present subject matter have been described with reference to specific exemplary embodiments thereof. It will, however, be evident that various modifications and changes can be made thereto without departing from the broader spirit and scope of the present disclosed subject matter. The present specification and figures are accordingly to be regarded as illustrative rather than restrictive.

Embodiments describe a PIC comprising a substrate, a buried oxide layer disposed on a first surface of the substrate, an active device layer disposed on the buried oxide layer, an optical transceiver including an optical transmission component and an optical reception component formed, at least in part, from the active device layer, and an etched region formed on the PIC to prevent optical or electrical radiation of the optical transmission component of the optical transceiver from impinging upon an optical or electrical signaling element of the optical reception component of the optical transceiver.

In some embodiments, the etched region is filled. In some embodiments, the etched region is formed between the optical transmission component of the optical transceiver and the optical reception component of the optical transceiver. In some embodiments, the etched region comprises at least one of an etch of the active layer extending to the buried oxide layer, or an etch of the active layer and the buried oxide layer extending to the first surface of the substrate.

In some embodiments, the etched region is formed on a second surface of the substrate opposite the first surface of the substrate. In some embodiments, the etched region is formed under the optical reception component of the optical transceiver. In some embodiments, the etched region extends through the substrate and the buried oxide layer. In some embodiments, the optical reception component further includes one or more electrical contacts, and wherein the etched region is filled with a metal material to contact at least one of the electrical contacts of the optical reception component to form a radio frequency (RF) ground plane for the optical reception component. In some embodiments, the etched region is to further thermally isolate the first transmission component from the second reception component.

Embodiments describe a PIC comprising a substrate, a buried oxide layer disposed on a first surface of the substrate, an active device layer disposed on the buried oxide layer, a first and a second optical components formed, at least in part, from the active device layer, and an etched region formed on the PIC and filled with a material to prevent optical or electrical radiation of the first optical component from impinging upon an optical or electrical signaling element of the second optical component.

In some embodiments, the etched region is formed between the first and second optical components. In some embodiments, the etched region comprises at least one of an etch of the active layer extending to the buried oxide layer, or an etch of the active layer and the buried oxide layer extending to the first surface of the substrate.

In some embodiments, the etched region is formed on a second surface of the substrate opposite the first surface of the substrate. In some embodiments, the etched region is formed under one of the first or the second optical component. In some embodiments, the etched region extends through the substrate and the buried oxide layer. In some embodiments, the first or the second optical component above the etched region further includes one or more electrical contacts, and wherein the etched region is filled with a metal material to contact at least one of the electrical contacts to form a radio frequency (RF) ground plane for the first or the second optical component above the etched region.

In some embodiments, the etched region is to further thermally isolate the first or the second optical component above the etched region. In some embodiments, the first and second optical components comprise a same component type. In some embodiments, the first optical component comprises an optical transmission component, and the second optical component comprises an optical reception component.

The invention claimed is:

1. A photonic integrated circuit, comprising:
   a substrate;
   a buried oxide layer disposed on a first surface of the substrate;
   an active device layer disposed on the buried oxide layer;
   an optical transceiver including an optical transmission component and an optical reception component formed, at least in part, from the active device layer; and
   an etched region formed on the photonic integrated circuit and extending through the substrate, the etched region configured to optically and electrically shield the optical reception component from the optical transmission component.

2. The photonic integrated circuit of claim 1, wherein the etched region is filled.

3. The photonic integrated circuit of claim 1, wherein the etched region is formed between the optical transmission component of the optical transceiver and the optical reception component of the optical transceiver.

4. The photonic integrated circuit of claim 3, wherein the etched region comprises at least one of:
   an etch of the active layer extending to the buried oxide layer; or
   an etch of the active layer and the buried oxide layer extending to the first surface of the substrate.

5. The photonic integrated circuit of claim 1, wherein the etched region is formed on a second surface of the substrate opposite the first surface of the substrate.

6. The photonic integrated circuit of claim 5, wherein the etched region is formed under the optical reception component of the optical transceiver.

7. The photonic integrated circuit of claim 1, wherein the optical reception component further includes one or more electrical contacts, and wherein the etched region is filled with a metal material to contact at least one of the electrical contacts of the optical reception component to form a radio frequency ground plane for the optical reception component.

8. The photonic integrated circuit of claim 1, wherein the etched region is to further thermally isolate the first transmission component from the second reception component.

9. A photonic integrated circuit, comprising:
   a substrate;
   a buried oxide layer disposed on a first surface of the substrate;
   an active device layer disposed on the buried oxide layer;
   a first optical component and a second optical component formed, at least in part, from the active device layer; and
   an etched region formed on the photonic integrated circuit and extending through the substrate, the etched region filled with a material that optically and electrically shields the second optical component from the first optical component.

10. The photonic integrated circuit of claim 9, wherein the etched region is formed between the first and second optical components.

11. The photonic integrated circuit of claim 10, wherein the etched region comprises at least one of:
    an etch of the active layer extending to the buried oxide layer; or
    an etch of the active layer and the buried oxide layer extending to the first surface of the substrate.

12. The photonic integrated circuit of claim 9, wherein the etched region is formed on a second surface of the substrate opposite the first surface of the substrate.

13. The photonic integrated circuit of claim 12, wherein the etched region is formed under one of the first or the second optical component.

14. The photonic integrated circuit of claim 9, wherein the first or the second optical component above the etched region further includes one or more electrical contacts, and wherein the etched region is filled with a metal material to contact at least one of the electrical contacts to form a radio frequency ground plane for the first or the second optical component above the etched region.

15. The photonic integrated circuit of claim 9, wherein the etched region is to further thermally isolate the first or the second optical component above the etched region.

16. The photonic integrated circuit of claim 9, wherein the first and second optical components comprise a same component type.

17. The photonic integrated circuit of claim 9, wherein the first optical component comprises an optical transmission component, and the second optical component comprises an optical reception component.

* * * * *